United States Patent
Voigt

(10) Patent No.: US 9,372,810 B2
(45) Date of Patent: Jun. 21, 2016

(54) COLLABORATIVE CACHING

(75) Inventor: Douglas L Voigt, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 149 days.

(21) Appl. No.: 14/368,786

(22) PCT Filed: Apr. 27, 2012

(86) PCT No.: PCT/US2012/035649
§ 371 (c)(1),
(2), (4) Date: Jun. 25, 2014

(87) PCT Pub. No.: WO2013/162614
PCT Pub. Date: Oct. 31, 2013

(65) Prior Publication Data
US 2014/0325161 A1 Oct. 30, 2014

(51) Int. Cl.
G06F 12/12 (2016.01)
G06F 12/08 (2016.01)
G06F 11/34 (2006.01)

(52) U.S. Cl.
CPC .......... *G06F 12/122* (2013.01); *G06F 11/3409* (2013.01); *G06F 11/3466* (2013.01); *G06F 12/0866* (2013.01); *G06F 2201/81* (2013.01); *G06F 2201/88* (2013.01); *G06F 2201/885* (2013.01); *G06F 2212/311* (2013.01); *G06F 2212/313* (2013.01); *G06F 2212/502* (2013.01)

(58) Field of Classification Search
CPC ............ G06F 12/0897; G06F 12/0866; G06F 12/0868; G06F 12/0811; G06F 2212/283; G06F 12/0871; G06F 12/0891; G06F 2212/1021; G06F 2212/1041; G06F 3/0689; G06F 12/0873; G06F 2212/314; G06F 2212/601
See application file for complete search history.

(56) References Cited

U.S. PATENT DOCUMENTS

| | | | |
|---|---|---|---|
| 4,426,682 A * | 1/1984 | Riffe et al. | 711/135 |
| 5,627,994 A | 5/1997 | Levy et al. | |
| 5,761,719 A * | 6/1998 | Mahin et al. | 711/139 |
| 6,311,216 B1 * | 10/2001 | Smith et al. | 709/226 |
| 6,356,980 B1 | 3/2002 | Arimilli et al. | |
| 6,360,273 B1 | 3/2002 | Beurket et al. | |
| 6,591,347 B2 | 7/2003 | Tischler et al. | |
| 6,598,121 B2 | 7/2003 | Challenger et al. | |
| 6,766,422 B2 | 7/2004 | Beyda | |
| 7,636,814 B1 * | 12/2009 | Karr et al. | 711/143 |

(Continued)

FOREIGN PATENT DOCUMENTS

| | | |
|---|---|---|
| JP | 2008252376 | 10/2008 |
| KR | 20020085996 | 11/2002 |
| KR | 20120026227 | 3/2012 |

OTHER PUBLICATIONS

ISR/WO PCT/US2012/035649, HP reference 82962489. Aug. 30, 2013, 9 pps.

Primary Examiner — Reginald Bragdon
Assistant Examiner — Thanh Vo
(74) Attorney, Agent, or Firm — Patent Law Group LLP

(57) ABSTRACT

A method is provided for collaborative caching between a server cache (104) of a server computer (102) and an array cache (112) of a storage array (110) coupled to the server computer. The method includes collecting instrumentation data on the server cache and the array cache of the storage array and, based on the instrumentation data, adjusting the operation of at least one of the server cache and the array cache.

9 Claims, 6 Drawing Sheets

(56) References Cited

U.S. PATENT DOCUMENTS

| | | |
|---|---|---|
| 7,765,196 B2 | 7/2010 | Papanyan et al. |
| 7,860,948 B2 | 12/2010 | Hundscheidt et al. |
| 8,356,142 B1* | 1/2013 | Danilak ........................ 711/137 |
| 2002/0107835 A1* | 8/2002 | Coram et al. ..................... 707/1 |
| 2005/0223174 A1* | 10/2005 | Mogi et al. ..................... 711/129 |
| 2005/0257005 A1* | 11/2005 | Jeddeloh ........................ 711/115 |
| 2010/0205213 A1* | 8/2010 | Broder et al. .................. 707/780 |
| 2011/0173179 A1 | 7/2011 | Chang |
| 2012/0271920 A1* | 10/2012 | Isaksson ........................ 709/219 |

* cited by examiner

Server Cache Page Read Hits

| Page | T0 | T1 | T2 | T3 | T4 | T5 | T6 | T7 | T8 |
|------|----|----|----|----|----|----|----|----|----|
| 1.1  |    | 2  |    |    | 1  |    |    |    |    |
| 1.3  | 5  | 4  | 5  | 5  | 3  | 5  |    | 5  | 4  |
| 1.5  | 2  | 2  | 1  |    |    |    |    |    |    |
| 2.2  | 20 | 12 | 30 | 26 | 19 | 22 | 21 | 19 | 28 |
| 2.3  | 15 | 8  | 9  | 16 | 5  | 2  |    |    |    |

Array Cache Page Read Hits

| Page | T0 | T1 | T2 | T3 | T4 | T5 | T6 | T7 | T8 |
|------|----|----|----|----|----|----|----|----|----|
| 1.1  |    |    |    |    |    |    |    |    |    |
| 1.3  |    |    |    |    |    |    |    |    |    |
| 1.5  |    |    |    |    |    |    |    |    |    |
| 2.1  | 6  | 7  | 4  | 7  | 5  | 9  | 3  | 6  | 7  |
| 2.4  |    |    |    | 3  | 2  | 4  | 2  | 3  |    |

Array Storage Page Read Accesses

| Page | T0 | T1 | T2 | T3 | T4 | T5 | T6 | T7 | T8 |
|------|----|----|----|----|----|----|----|----|----|
| 1.1  | 1  |    |    |    |    |    |    |    |    |
| 1.2  |    |    |    |    |    |    |    |    |    |
| 1.3  |    |    |    |    |    |    |    |    |    |
| 1.4  |    |    |    |    |    |    |    |    |    |
| 1.5  |    |    |    |    |    |    |    |    |    |
| 1.6  |    |    |    |    |    |    |    |    |    |
| 2.1  |    |    |    |    |    |    |    |    |    |
| 2.2  |    |    |    |    |    |    |    |    |    |
| 2.3  |    |    |    |    |    |    |    |    |    |
| 2.4  |    |    | 1  |    |    |    |    |    |    |

COLLABORATIVE CACHING

TECHNICAL FIELD

The present disclosure is related to caching in storage systems.

BACKGROUND

A cache is a fast memory that stores frequently accessed data so that future access requests for that data can be served quickly without repeatedly retrieving the same data from a comparatively slow backing store. A cache is a pool of entries where each entry has data and a tag. The tag identifies the corresponding data in the backing store. A page cache refers to a cache of disk-backed pages. When a page cache is full, a page eviction policy determines which page is removed to make room for a new page of data.

DETAILED DESCRIPTION

With the increasing feasibility of solid state storage as a means of placing large caches in both server computers and storage arrays (e.g., disk arrays), hierarchies of large caches will be more common This presents an opportunity to decide how to use cache at various levels. Today each cache decides independently as to which data to cache. The present disclosure provides a way to make multiple hierarchical caches responsive to page management policy modifications derived from real-time analysis of cache usage patterns. Hierarchical caches are integrated with an analytics module that combines information from each cache to adjust or tune their configurations.

The present disclosure provides collaborative caching where cache page policies in hierarchical caches are responsive to coordinated adjustments. An analytics module receives usage statistics from multiple hierarchical caches over time, analyzes the statistics, and derives triggers that adjust the cache page policies in the hierarchical caches.

Figure 1:
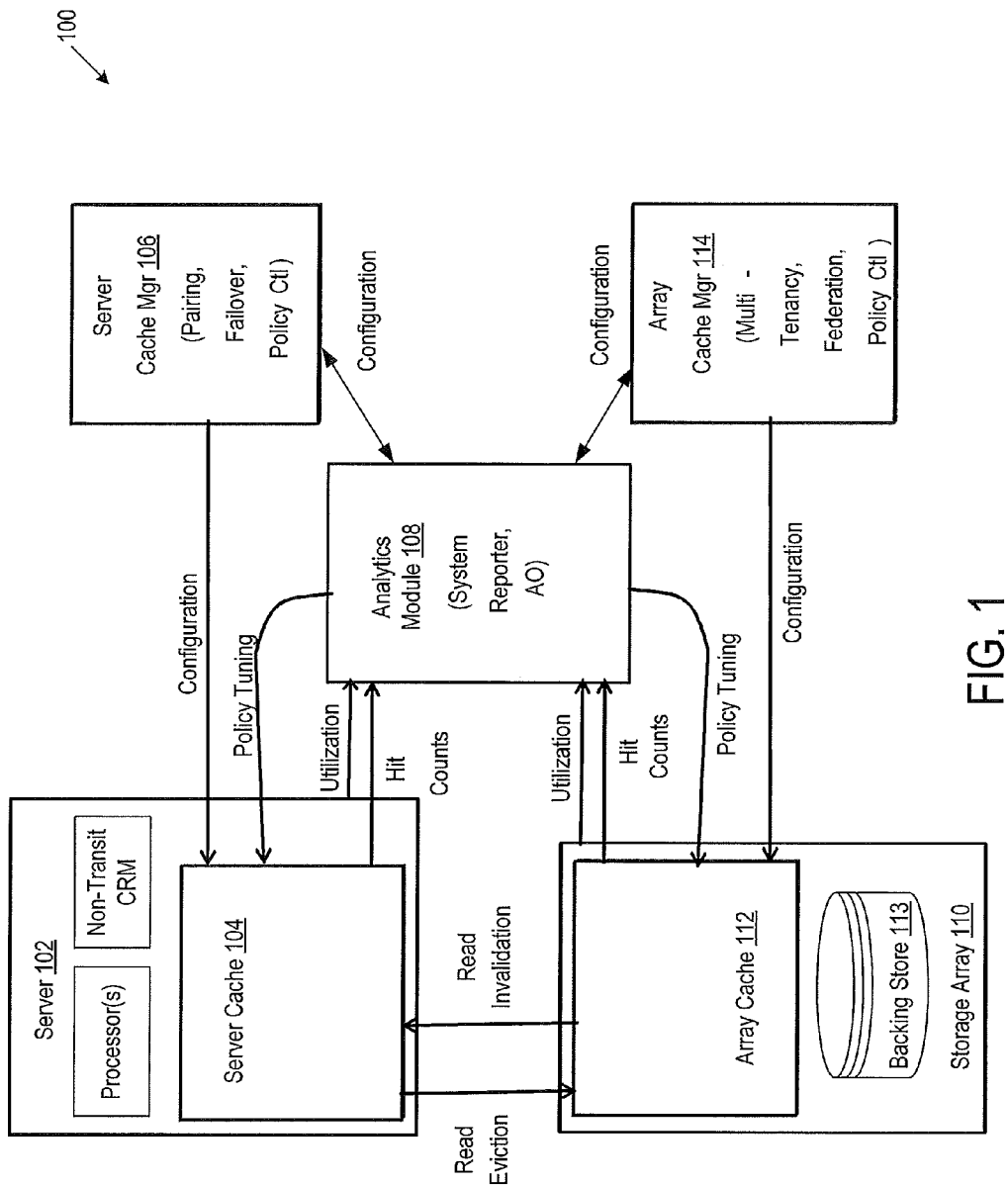
FIG. 1 is a block diagram of a collaborative cache management system in one example of the present disclosure.

FIG. 1 is a block diagram of a collaborative cache management system 100 in one example of the present disclosure. System 100 includes a server computer 102 with processors 103 and a server cache 104. In one example, server cache 104 is implemented with a solid state drive that may take the form of a peripheral component interconnect (PCI) card. In another example, server cache 104 is implemented with RAM. System 100 includes a server cache manager 106 that sets the configuration of server cache 104, such as the pairing of server cache capacity with array volumes and the coarse grain configuration of page replacement and read-ahead policies. Server cache manager 106 may also be involved in data migration and cluster failover operations. Server cache manager 106 may be located on server computer 102 or its own machine. Server cache manager 106 may be part of the operating system (OS) or an application that runs on the OS. In one example, server cache manager 106 installs a page replacement policy on server cache 104 to modify eviction and read ahead in server cache 104 in a manner different from the preexisting page replacement policy. The new page replacement policy may be responsive to an analytics module 108 of system 100 in real-time. The new page replacement policy may replace the old page replacement policy or it may activate and interact with additional features of the old page replacement policy. This creates the flexibility of server cache 104 and server cache manager 106 to operate with or without analytics module 108.

System 100 includes a storage array 110 with an array cache 112 and a backing store 113. Storage array 110 provides array volumes to one or server computers including server computer 102. In one example, storage array 110 is a disk array with array cache 112 implemented with a solid state drive and backing store 113 implemented with hard disk drives. In another example, storage array 110 is a solid state array with array cache 112 implemented with RAM and backing store 113 implemented with solid state drives. System 100 includes an array cache manager 114 that defines the configuration of array cache 112, such as the multi-tenancy and the federation across arrays. Array cache manager 106 may be located on storage array 110 or its own machine. In one example, array cache manager 114 installs a page replacement policy on cache array 112 to modify eviction and read ahead in server cache 104 in a manner different from the preexisting page replacement policy. The newly installed page replacement policy may be responsive to analytics module 108 in real-time. The new page replacement policy may replace the old page replacement policy or it may activate and interact with additional features of the old page replacement policy. This creates the flexibility of array cache 112 and array cache manager 114 to operate with or without analytics module 108.

In addition to cache management operations such as read-ahead and page eviction, server cache 104 and array cache 112 may signal directly to each other when pages are evicted from server cache 104 or when storage array 110 detects that pages potentially held in server cache 104 are written by another server in storage array 110 and therefore need to be invalidated.

Server computer 102, server cache 104, storage array 110, and array cache 112 generate streams of instrumentation data for analytic module 108. The types of instrumentation data include (1) cache hits or misses, (2) utilization of server resources such as processors and buses, (3) input/output (I/O) distribution across both cached and backing store capacity within storage array 110.

Although FIG. 1 illustrates a specific flow of communication between analytics module 108 and other components, system 100 may be implemented using alternate flows. For example, communications may flow directly from array cache manager 114 to server cache manager 106 or vice versa. Portions of analytics module 108 may reside with or integrated into one or both server cache 104 and array cache 112. Communication between server cache 104 and array cache 112 may be direct or they may involve analytics module 108.

Figures 2, 3:
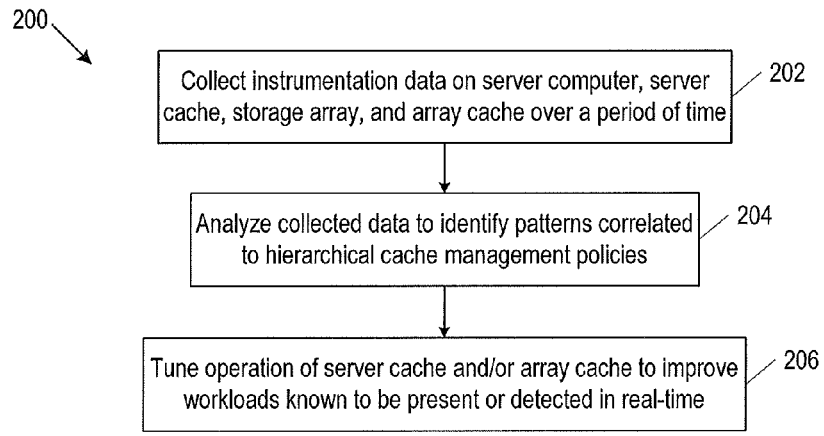
FIG. 2 is a flowchart of a method for collaborative caching between a server cache and an array cache of FIG. 1 in one example of the present disclosure.
FIG. 3 illustrates three tables listing sample accesses to pages in the server cache, the array cache, and a backing store of FIG. 1 in one example of the present disclosure.

FIG. 2 is a flowchart of a method 200 for collaborative caching between server cache 104 (FIG. 1) and array cache 112 (FIG. 1) in one example of the present disclosure. Method 200 begins in block 202. In block 202, analytics module 108 (FIG. 1) collects instrumentation data on server computer 102 (FIG. 1), server cache 104, and array cache 112 over a period of time, such as on the order of seconds or tens of seconds, that is several orders of magnitude longer than the I/O response times experienced by the system. Block 202 is followed by block 204. In block 204, analytics module 108 analyzes (e.g., filters) the collected data to identify patterns that are correlated with specific hierarchical cache management policies described in more detail in FIGS. 4 to 8. Analytics module 108 may analyze the collected data in real-time as they come in or at a later time. Block 204 is followed by block 206. In block 206, analytics module 108 periodically tunes the operation of server cache 104 and/or array cache 112 to improve the performance of various workloads that are known to be present in system 100 or are detected by analytics module 108 in real-time. Analytics module 108 is informed of the configurations of server computer 102, server cache 104, storage array 112 (FIG. 1), and array cache 112 through communications with server cache manager 106 and array cache manager 114. This information includes the pairing of server cache capacity to array. The capabilities of system 100 are best described in several use cases.

1—Storage array 110 and array cache 112 have information about the flow of server cache misses. Based on this information analytics module 108 determines that a different distribution of server cache capacity to array volumes may yield a higher hit rate.

2—Analytics module 108 combines cache statistics from server cache 104 and array cache 112 so that the frequency and/or recency data being used to evict cache pages can account for time spent in both caches. This leads to better cache page eviction decisions.

3—If processors, buses, or other resources are over-utilized in server computer 102 due to cache management activity, analytics module 108 may tune the cache policy of server cache 104 to be more restrictive in accepting new pages. At the same time analytics module 108 may tune the cache policy of array cache 112 to be biased to retain pages that would otherwise have been left only in server cache 104.

4—During a failover or migration event, analytics module 108 may inform array cache 112 to reread specific data that is subject to bulk invalidation due to the event.

5—If workload patterns indicate that pages evicted from server cache 104 should be retained in array cache 112, then server cache 104 may be selectively configured to generate cache eviction messages. The cache eviction messages may or may not include the data being evicted depending on the resources available in server computer 102 and storage array 110. When the cache eviction messages do not include the data being evicted, the data is reread from backing store 113 into array cache 110.

6—If data being cached in server cache 104 is frequently invalidated by writes by other server computers connected to storage array 110, analytics module 108 may configure server cache 104 not to retain the data the next time it is read so that server cache 104 and server resources (e.g., processors and buses) are not wasted.

7—If data is read into server cache 104 at a time when blocks with addresses that sequentially follow the data are already in the array cache 112 then server cache 104 has an opportunity to perform an after-the-fact read ahead with very little overhead. When this condition is detected, analytics module 108 informs server cache 104 of the opportunity so that server cache 104 can modify its read ahead policy to take advantage of the additional sequential blocks in array cache 112.

The use cases above are driven by instrumentation data of server computer 102, server cache 104, storage array 110, and array cache 112. One type of instrumentation data is the number of accesses to pages in server cache 102, array cache 112, and backing store 113. FIG. 3 illustrates three tables listing sample accesses to pages in server cache 102 (FIG. 1), array cache 112 (FIG. 1), and backing store 113 (FIG. 1) in one example of the present disclosure. Read access counts are organized by page number and time of access. The page numbers are shown in two parts, a first part representing an array volume and a second part representing a page within the volume. A given page number reflects the same data blocks regardless of which table contains the page number. Note that the cache tables for server cache 102 and array cache 112 are sparse while the storage table for backing store 113 is not.

A typical hierarchical cache operation can be observed by tracing the history of particular pages such as page 1.1. During time T0, page 1.1 is accessed from backing store 113. Page 1.1 flows up through array cache 112 and into server cache 104 at that point but is not counted as a hit in either just yet. At time T1, page 1.1 gets a hit in server cache 104. A different situation is illustrated by page 1.3, which gets relatively constant hits in server cache 104 throughout the time period shown FIG. 3. Note that a cache miss in server cache 104 results in a cache hit in array cache 112 when that page containing the requested data is in array cache 112. If not, a cache miss also occurs in array cache 112 and backing store 113 is read to retrieve the requested data.

To illustrate the operation of use case 1 described above, consider a scenario where a fixed number of server cache pages are reserved for each array volume in server cache 104. For example, assume an administrator has configured server cache 104 such that volume 1 has three (3) server cache pages and volume 2 has two (2) server cache pages. Cache allocation may be segregated by volume to ensure that a minimum of pages are always available for each volume.

In the scenario illustrated in FIG. 3, the server cache table shows that pages 1.1 and 1.5 are getting very few hits while pages 2.2 and 2.3 are accessed more frequently. The array cache table shows that page 2.1 is also heavily accessed. This shows the advantage of using statistics at multiple levels of the system to recognize a situation where reallocation of server cache 104 would yield higher server cache hit rates. This approach is efficient as it takes advantage of the tracking that is already occurring within array cache 112.

Figure 4:
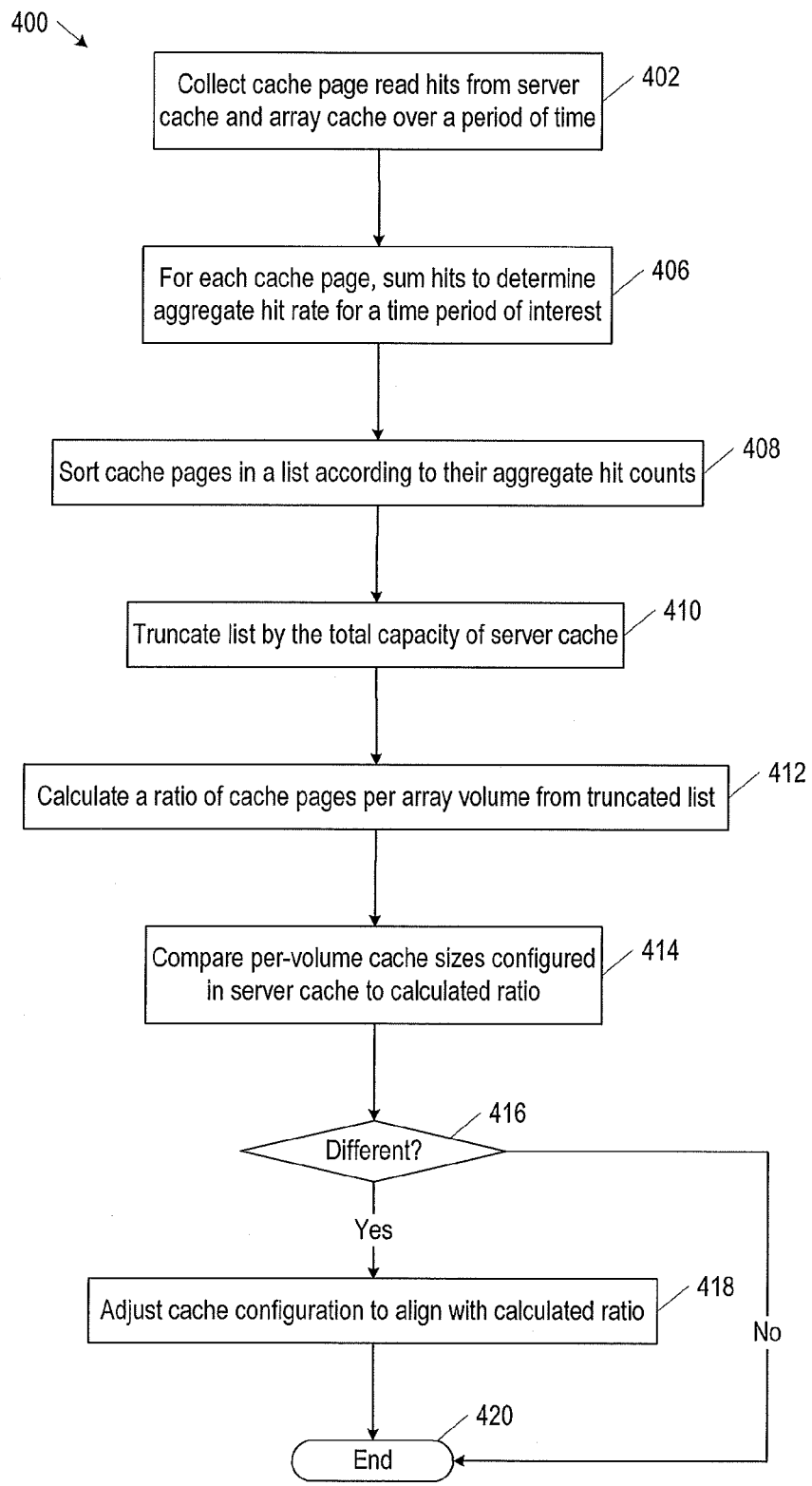
FIG. 4 is a flowchart of a method, which is one implementation of the method of FIG. 2, for addressing misalignment of server cache capacity in one example of the present disclosure.

FIG. 4 is a flowchart of a method 400, which is one implementation of method 200, for addressing use case 1 having misalignment of server cache capacity in one example of the present disclosure. Method 400 may run periodically, such as every ten seconds. Method 400 begins in block 402.

In block 402, analytics module 108 (FIG. 1) collects cache page read hits from server cache 104 (FIG. 1) and array cache 112 (FIG. 1) over a period of time. Block 402 is followed by block 406.

In block 406, for each cache page in either server cache 104 or array cache 112, analytics module 108 sums cache page read hits associated with the page over a time period of interest, such as ten seconds or more, to determine an aggregate hit rate for the cache page in both server cache 104 and array cache 112. Block 406 is followed by block 408.

In block 408, analytics module 108 sorts the cache pages in a list according to their aggregate hit rates. For the example in the tables of FIG. 3, the list consists of page 2.2, 2.3, 2.1, 1.3, 2.4, 1.5, and 1.1. Block 408 is followed by block 410.

In block 410, analytics module 108 truncates the list by the total capacity of server cache 104. From the example in the tables of FIG. 3, the total capacity of server cache 104 is five (5) cache pages so the list is truncated to five cache pages with the highest aggregate hit rates. For the example in the tables of FIG. 3, the truncated lists consists of pages 2.2, 2.3, 2.1, 1.3, and 2.4. Block 410 is followed by block 412.

In block 412, analytics module 108 calculates the ratio of the number of cache pages per array volume from the truncated list. For examples in the tables of FIG. 3, the truncated list includes one (1) page from volume 1 and four (4) pages from volume 2 so the ratio across volumes 1 and 2 is 1:4. Block 412 is followed by block 414.

In block 414, analytics module 108 compares the per-volume cache sizes configured in server cache 104 to the calculated ratio from block 412. For the examples in the tables of FIG. 3, the per-volume cache sizes are three (3) pages for volume 1 and two (2) pages for volume 2. Block 414 is followed by block 416.

In block 416, analytics module 108 determines if the per-volume cache sizes configured in server cache 104 and the calculated ratio from block 412 are different. If so, block 416 is followed by block 418. Otherwise block 416 is followed by block 420, which ends method 400. For the example in the tables of FIG. 3, the per-volume cache sizes configured in cache 104 (3:2) is different from the calculated ratio from block 412 (1:4).

In block 418, analytics module 108 adjusts the server cache configuration to align the per-volume cache sizes to the calculated ratio from block 412. Block 418 is followed by block 420, which ends method 400.

Use case 2 above can be illustrated using the tables in FIG. 3. Based on the tables in FIG. 3, server cache 104 is likely thrashing its content between cache pages 2.1, 2.2, and 2.3. This is because the cache page eviction policy for server cache 104 does not account for data that only exists in disk array 112. If the cache page statistics from server cache 104 and array cache 112 are combined when server cache 104 makes page eviction decisions then those decisions will reduce cache thrashing in the situation illustrated above.

Figure 5:
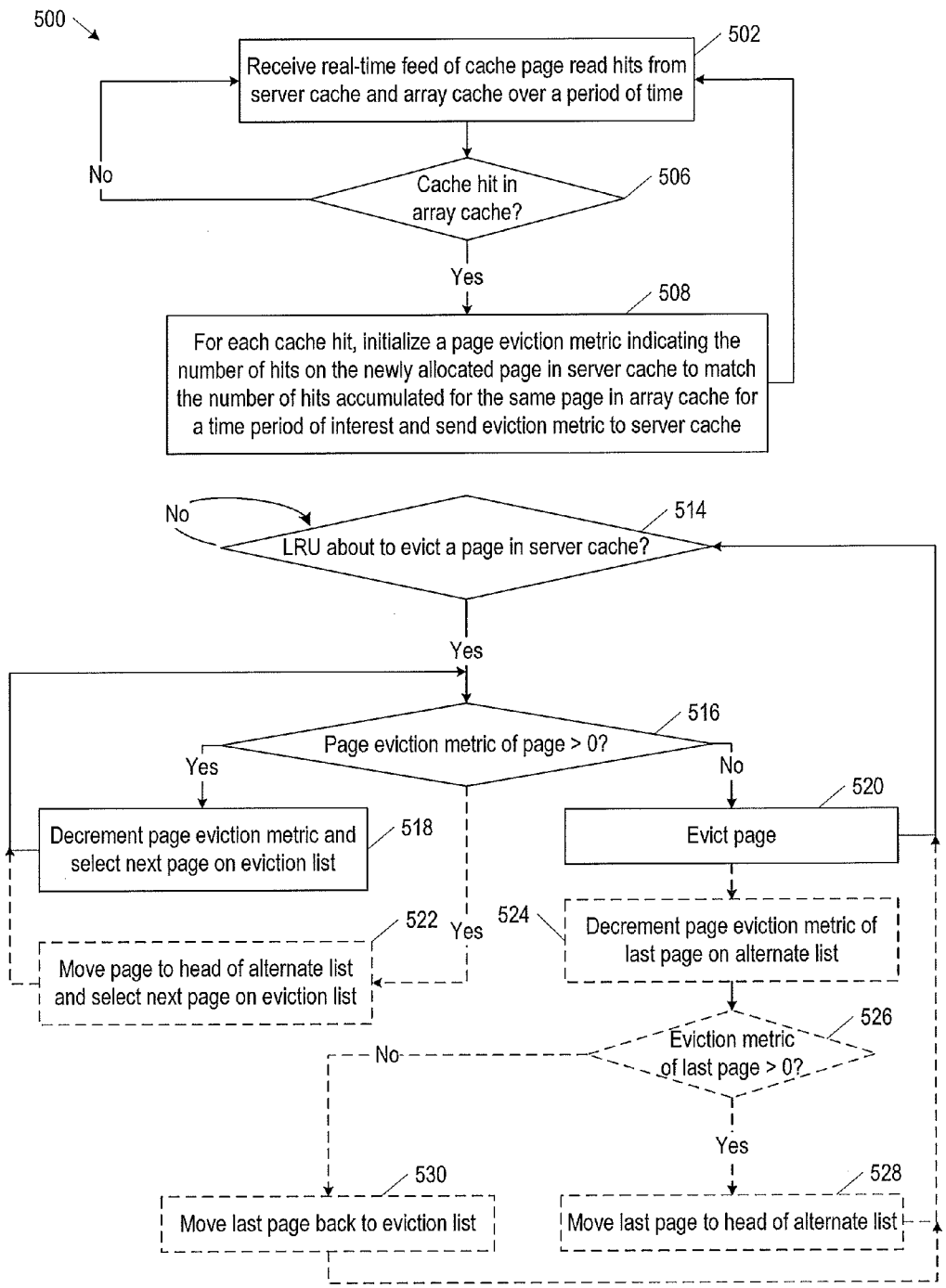
FIG. 5 is a flowchart of a method, which is one implementation of method of FIG. 2, for addressing cache thrashing in one example of the present disclosure.

FIG. 5 is a flowchart of a method 500, which is one implementation of method 200, for addressing use case 2 with cache thrashing in one example of the present disclosure.

Method 500 includes blocks 502, 504, 506, 508, 510, and 512 performed by analytics module 108 (FIG. 1), and blocks 514, 516, 518, and 520 performed by server cache 104 (FIG. 1).

In block 502, analytics module 108 (FIG. 1) receives a real-time instrumentation data feed of cache page read hits from server cache 104 (FIG. 1) and array cache 112 (FIG. 1) periodically (e.g., every second). Block 502 is followed by block 506.

In block 506, analytics module 108 determines if a cache hit is detected in array cache 112. If so, block 506 is followed by block 508. Otherwise block 506 is followed by block 510.

In block 508, for each cache hit in array cache 112, analytics module 108 initializes a page eviction metric in server cache 104 that indicates the number of hits on the newly allocated cache page in server cache 104 to match the number of hits accumulated for the same cache page in array cache 112 from the sample collected in block 502. The page eviction metric is used to keep the cache page from being evicted from server cache 104 for a longer period than would otherwise be the case under a least recently used (LRU) policy. Analytics module 108 sends the eviction metrics to server cache 104. Block 508 is followed by block 502.

In block 514, server cache 104 determines if one of its cache page is about to be evicted under the LRU policy. Eviction occurs when a cache requires space for a new page. In an LRU policy, a cache keeps a list of pages in order of usage. The least recently used cache page at the bottom of the eviction list is evicted from the cache to make room for more recently used data. If a cache page in server cache 104 is about to be evicted under the LRU policy, block 514 is followed by block 516. Otherwise block 514 loops back to itself.

In block 516, server cache 104 determines if the page eviction metric for the about-to-be-evicted cache page is greater than a threshold (e.g., greater than zero). If so, block 516 is followed by block 518. Otherwise block 516 is followed by block 520.

In block 518, in one example, server cache 104 delays the eviction of the about-to-be-evicted cache page by decrementing the page eviction metric by one and selecting the next page in the eviction list. This process delays eviction by a small amount. If the delay results in a hit of the page that would have been evicted then that page will move to the top of the eviction list. Block 518 is followed by block 516.

In block 520, server cache 104 evicts the cache page. Block 520 is followed by block 514.

In another example, server cache 104 provides additional delay by diverting pages with non-zero page eviction metrics to the head of an alternate list where the page eviction metrics are decremented in a round robin fashion. When the page eviction metric of a cache page is not greater than the threshold, that cache page is returned to the eviction list. In this example, block 522 replaces block 518, and blocks 524, 526, 528, and 530 are added.

Block 522 follows from the "yes" path of decision block 516. In block 522, server cache 104 moves the cache page to an alternate list and then selects the next cache page from the eviction list. In this example of method 500, a boundary condition may occur when the eviction list becomes empty. When this boundary condition occurs, server cache 104 selects the last cache page on the alternate list to evict regardless of its page eviction metric. Block 522 is followed by block 516.

Block 524 follows from block 520. In block 520, after a cache page is evicted in block 524, server cache 104 decrements the page eviction metric of the last cache page at the tail of the alternate list. Block 524 is followed by block 526.

In block 526, server cache 104 determines if the page eviction metric of the last cache page is greater than the threshold (e.g., 0). If so, block 526 is followed by block 528. Otherwise block 526 is followed by block 530.

In block 528, server cache 104 moves the last cache page to the head of the alternate list. Block 528 is followed by block 514.

In block 530, server cache 104 moves the last cache page from the alternate list to the eviction list. Thus pages in the alternate list become candidates for eviction again when they have not had a hit before their page eviction metric reaches zero. Block 530 is followed by block 514.

Figure 6:
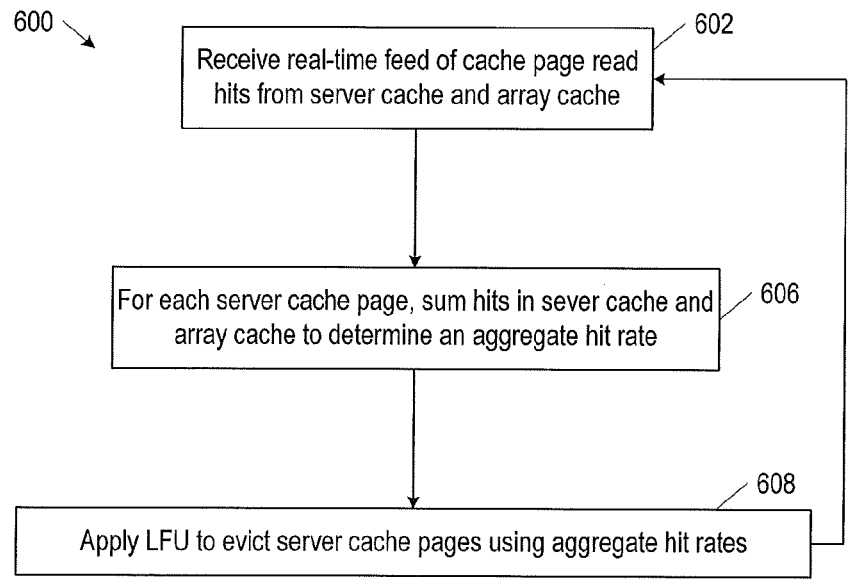
FIG. 6 is a flowchart of an alternative method to the method of FIG. 5 in one example of the present disclosure.

As an alternative to method 500, a method 600 in FIG. 6 uses a running hit rate average that includes the disk array cache hit rate to implement a least frequently used (LFU) policy in one example of the present disclosure. Method 600 begins in block 602.

In block 602, analytics module 108 (FIG. 1) receives a real-time instrumentation data feed of cache page read hits from server cache 104 (FIG. 1) and array cache 112 (FIG. 1) periodically (e.g., every second). Block 602 is followed by block 606.

In block 606, for each cache page in server cache 104, analytics module 108 sums hits associated with that cache page in server cache 104 and array cache 112 to determine a running hit rate average. Block 606 is followed by block 608.

In block 608, analytics module 108 provides the running hit rate averages for the server cache pages to server cache 104. Server cache 104 in turn evicts cache pages using a LFU policy based on the running hit rate averages of the server cache pages. Block 608 is followed by block 602.

Another type of instrumentation data is resource utilization in server computers 102, such as that of the processors. Cache analytics based on processor utilization are illustrated in use case 3 above.

Cache lookups consume processor time. If a hit is detected then I/O is avoided, resulting in a net savings of processor utilization. If the cache lookup detects a miss then both the cache lookup and the resulting I/O consume processor time. If processor utilization is unacceptably high, then it may be advantageous to avoid cache lookups in a predictable pattern. This may be accomplished by triggering a decision to turn off server cache 104 for volumes that are experiencing low server cache hit rates. This increases the available cache pages and in turn increases hit rates for volumes that are still being cached. With fewer cache lookups due to uncached volumes and higher cache hits on cached volumes, the total server processor time spent on cache management is reduced. Storage array 110 is still caching volumes that are uncached in server computer 102 so I/O performance remains good.

Figure 7:
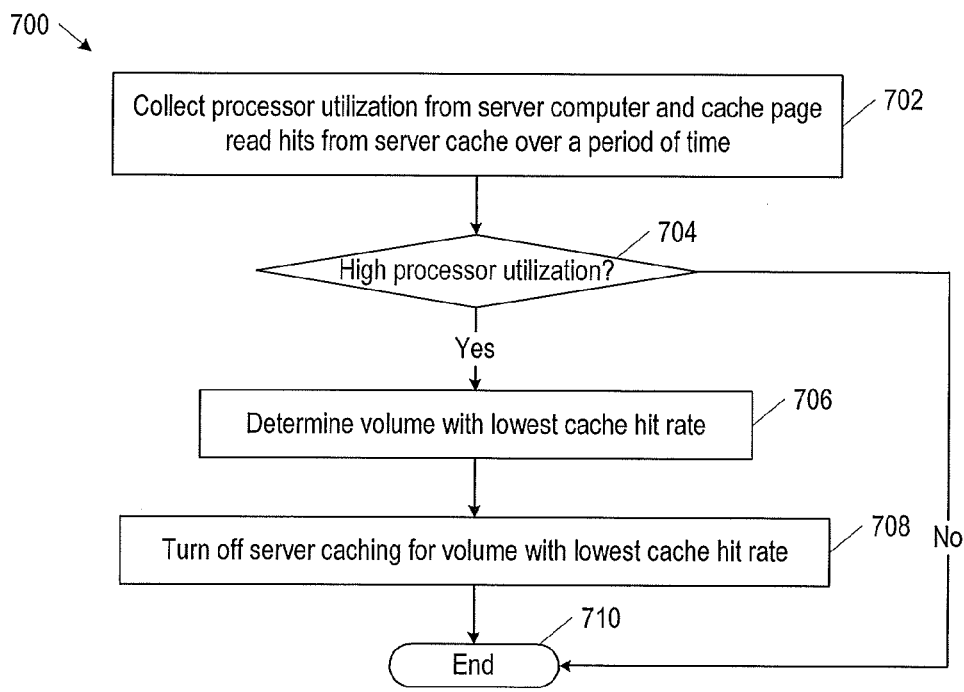
FIG. 7 is a flowchart of a method, which is one implementation of method of FIG. 2, for addressing high processor utilization in one example of the present disclosure.

FIG. 7 is a flowchart of a method 700, which is one implementation of method 200, for addressing use case 3 having high server resource utilization (e.g., processor utilization) in one example of the present disclosure. Method 700 begins in block 702.

In block 702, analytics module 108 (FIG. 1) collects processor utilization from server computer 102 and cache page read hits from server cache 104 (FIG. 1) and array cache 112 (FIG. 1) over a period of time. Block 702 is followed by block 704.

In block 704, analytics module 108 analyzes the collected data and determines processor utilization is above a threshold such as 90%. If so, block 704 is followed by block 706. Otherwise block 704 is followed by block 710, which ends method 700.

In block 706, analytics module 108 calculates the per-volume server cache hit rate and identifies the volume with the lowest hit rate. Block 706 is followed by block 708.

In block 708, analytics module 108 causes server cache 104 to turn off server caching for the volume with the lowest server cache hit rates identified in block 706. Block 708 is followed by block 710, which ends method 700.

Although method 700 has been described for processor utilization, in another example method 700 is applied to a different server resource or a combination of server resources.

Use case 4 above applies to systems where multiple server computers 102 in a cluster are connected to the same storage array 110 and each server computer 102 has its own cache. At various points during normal operation an operating system or hypervisor may decide to move a process from a first server computer to a second server computer. This means that server cache 104 on the first server computer will become not only useless but invalid due to writes the process will issue once it reaches the second server computer. In this scenario once the process move begins it should turn off and invalidate the server cache on the first server computer because the destination server may begin writing data at any time.

Server cache 104 on the second server computer may be slowly filled with data as the process begins doing I/O at its new location. With analytics module 108, there is information available about what was in server cache 104 at the first server computer, which may be used to fill array cache 112 at storage array 110 with data that will likely soon be needed by the relocated process. It is advantageous to fill array cache 112 with relocated data to accommodate cases where server cache 104 is not large enough to hold the data that was previously cached due to cache usage by other processes already running on the second server. In those cases the usage of cache on the destination server will be rebalanced over time by standard cache management policies. Meanwhile the array cache is used to accelerate data fetched by the second server computer during the rebalancing process. This shortens the time required for the process to regain full I/O performance on the second server computer.

Figure 8:
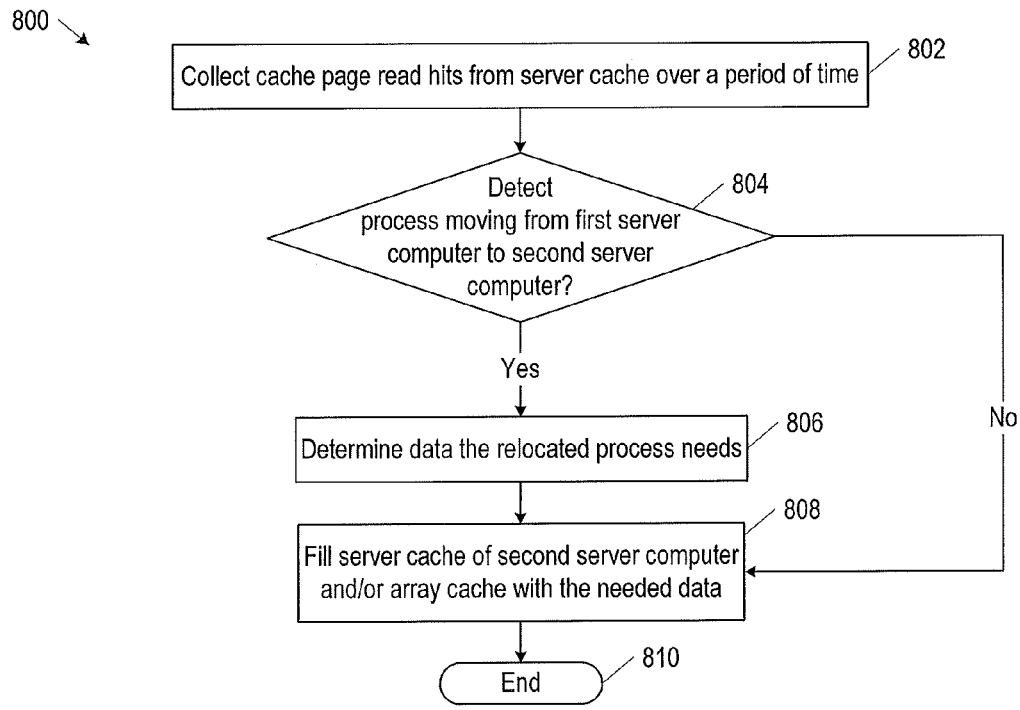
FIG. 8 is a flowchart of a method, which is one implementation of method of FIG. 2, for addressing a process move from a first server computer to a second server computer in one example of the present disclosure.

FIG. 8 is a flowchart of a method 800, which is one implementation of method 200 (FIG. 2), for addressing use case 4 where a process moves from a first server computer to a second server computer in one example of the present disclosure. Method 800 begins in block 802.

In block 802, analytics module 108 (FIG. 1) collects cache page read hits from server cache 104 (FIG. 1) for a period of time. Block 802 is followed by block 804.

In block 804, analytics module 108 determines if a process is being moved from the first server computer to the second server computer as indicated by an explicit notification generated by the hypervisor. If so, block 804 is followed by block 806. Otherwise block 804 is followed by block 810, which ends method 800.

In block 806, analytics module 108 analyzes the collected data and determines the data the relocated process needs. Block 806 is followed by block 808.

In block 808, analytics module 108 causes array cache 112 (FIG. 1) of storage array 110 (FIG. 1) to be filled with the needed data for the relocated process. Block 808 is followed by block 810, which ends method 800.

Figure 9:
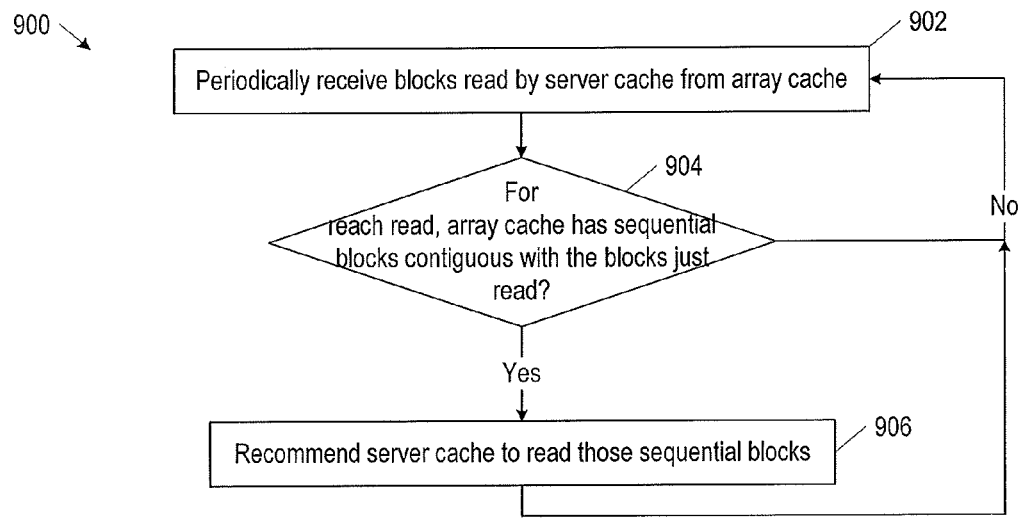
FIG. 9 is a flowchart of a method, which is one implementation of method of FIG. 2, for addressing read ahead of sequential data in server cache in one example of the present disclosure Use of the same reference numbers in different figures indicates similar or identical elements.

FIG. 9 is a flowchart of a method 900 for addressing use case 7 where sequential blocks are located in array cache 112 (FIG. 1) in one example of the present disclosure. Method 900 begins in block 902.

In block 902, analytics module 108 (FIG. 1) receives a real-time instrumentation data feed of blocks read by server cache 104 (FIG. 1) from array cache 112 (FIG. 1) periodically (e.g., every second). Block 902 is followed by block 904.

In block 904, for each read from array cache 112, analytics module 108 (FIG. 1) checks in array cache 112 for sequential blocks that are contiguous with the blocks just read. If such blocks are found, then block 904 is followed by block 906. Otherwise block 904 is followed by block 902.

In block 906, analytics module 108 informs server cache 104 of its recommendation to read those sequential blocks. Server cache 104 reads those sequential blocks when it gets the recommendation from analytics system 108.

In another example, server cache 104 has its own sequential access detection to determine whether or not it would be beneficial to read the additional blocks. Server cache 104 may read the additional blocks when it has already detected a sequential workload in the area leading up to the recommended blocks.

Various other adaptations and combinations of features of the examples disclosed are within the scope of the invention. The present disclosure provides examples of analytic instrumentation data, filters, and triggers that may be used to cause modifications to cache configurations and policies. Additional forms of instrumentation data and policy modification are possible given the creation of the analytic capability described by the present disclosure. These techniques may also include instrumentation data of pages that are stored only on disks within the array to further increase the body of data available for improving caching decisions. Numerous examples are encompassed by the following claims.

What is claimed is:

1. A method for collaborative caching between a server cache of a server computer and an array cache of a storage array coupled to the server computer, comprising:
    collecting instrumentation data on the server cache and the array cache of the storage array; and
    based on the instrumentation data, adjusting the operation of at least one of the server cache and the array cache in real-time,
        wherein adjusting the operation of at least one of the server cache and the array cache comprises adjusting a distribution of server cache capacity,
        wherein adjusting the distribution of server cache capafcity comprises:
            for each a in either the server cache or the array cache,
                summing cache hits for the cache page over a time period of interest to determine an aggregate hit rate for the cache page;
                sorting pages in a list according to their aggregate hit rates;
                truncating the list by a total capacity of the server cache;
                calculating a ratio of number of cache pages in the truncated list per volume;
                comparing per-volume cache sizes in the server cache to the calculated ratio; and
                adjusting the per-volume cache sizes to au n with the calculated ratio when they are different.

2. The method of claim 1, wherein the instrumentation data include server cache page hits, array cache page hits, and server resource utilization.

3. The method of claim 1, wherein adjusting the operation of at least one of the server cache and the array cache comprises:
    detecting high server processor utilization;
    determining a volume on the server computer with low server cache hit rates; and
    turning off server caching for the volume.

4. The method of claim 1, wherein adjusting the operation of at least one of the server cache and the array cache comprises:
    detecting a process relocating from the server computer to another server computer coupled to the storage array;
    determining data needed by the relocated process; and
    filling at least one of another server cache of the other server computer and the array cache with the needed data.

5. The method of claim 1, wherein adjusting the operation of at least one of the server cache and the array cache comprises:
    for each cache read of blocks in the array cache, determining if the array cache has sequential blocks contiguous with the just read blocks; and
    when the array cache has the sequential blocks contiguous with the just read blocks, reading the sequential blocks from the array cache into the server cache.

6. The method of claim 1, wherein adjusting the operation of at least one of the server cache and the array cache comprises:
    determining a workload indicating that evicted cache pages from the server cache should be retained in the array cache; and
    causing the server cache to send a cache eviction message for each evicted cache page to the array cache, wherein the array cache caches the evicted page.

7. The method of claim 1, wherein adjusting the operation of at least one of the server cache and the array cache comprises:
    detecting data cached in the server cache is frequently invalidated by writes from other server computers; and
    configuring the server cache not to retain any data the next time it is read.

8. A non-transitory computer readable medium encoded with executable instructions for execution by a processor to:
    collect instrumentation data on the server cache and the array cache of the storage array; and
    based on the instrumentation data, adjust the operation of at least one of the server cache and the array cache in real time,
        wherein adjsting the operation of at least one of the server cache and the array cache comprises adjusting a distribution of server cache capacity,
        wherein adjusting the distribution of server cache capacity comprises:
            for each page in either the server cache or the array cache,
                summing cache hits for the cache page over a time period of interest to determine an aggregate hit rate for the cache pane;
                sorting pages in a list according to their aggregate hit rates;
                truncating the list by a total capacity of the server cache;
                calculating a ratio of number of cache pages in the truncated list per volume;
                comparing per-volume cache sizes in the server cache to the calculated ratio; and
                adjusting the per-volume cache sizes to align with the calculated ratio when they are different.

9. A computer system, comprising:
    a server computer comprising a server cache;
    a storage array comprising an array cache, the storage array being coupled to the server computer; and
    an analytics system to:
        collect instrumentation data on the server cache and the array cache of the storage array; and
        based on the instrumentation data, adjust the operation of at least one of the server cache and the array cache in real-time, wherein adjusting the operation of at least one of the server cache and the array cache comprises adjusting a distribution of server cache capacity, wherein adjusting the distribution of server cache capacity comprises:

for each page in either the server cache or the array cache, summing cache hits for the cache page over a time period of interest to determine an aggregate hit rate for the cache pane;

sorting pages in a list according to their aggregate hit rates;

truncating the list by a total capacity of the server cache;

calculating a ratio of number of cache pages in the truncated list per volume;

comparing per-volume cache sizes in the server cache to the calculated ratio; and adjusting the per-volume cache sizes to align with the calculated ratio when they are different.

* * * * *